Sept. 21, 1937.   G. J. CAMPBELL, JR   2,093,547
LINK FOR TIRE CHAINS
Filed Jan. 5, 1937
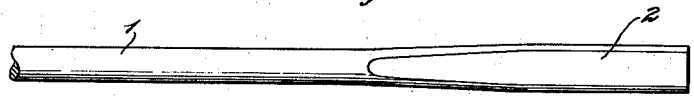
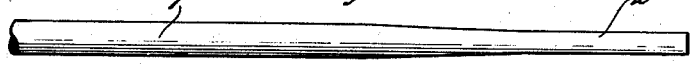
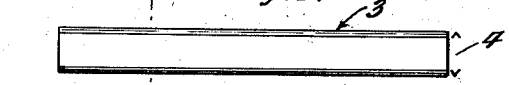 
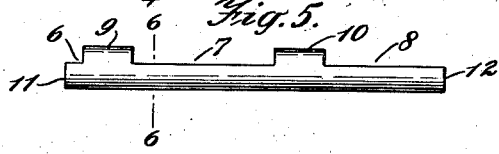 
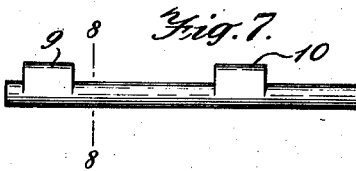 
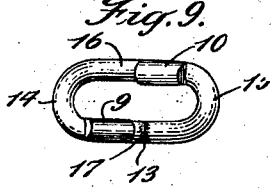
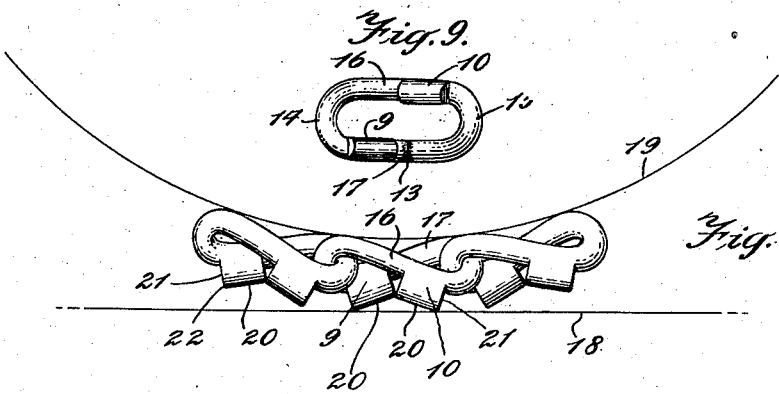
INVENTOR.
BY
ATTORNEY.

Patented Sept. 21, 1937

2,093,547

UNITED STATES PATENT OFFICE 2,093,547

LINK FOR TIRE CHAINS

George J. Campbell, Jr., York, Pa., assignor to International Chain & Manufacturing Company, York, Pa., a corporation of Pennsylvania Application January 5, 1937, Serial No. 119,075

3 Claims. (Cl. 152—14)

This invention relates to a novel and improved link. The novel features of the link will be best understood from the following description and the accompanying drawing, in which I have shown a selected embodiment of the link and a selected manner in which the link may be made. In the drawing:

Fig. 1 is a view showing the first step of the selected method;

Fig. 2 is a view of the same structure as in Fig. 1 but taken at right angles to Fig. 1;

Fig. 3 is an elevation of a length of wire formed as indicated in Figs. 1 and 2;

Fig. 4 is a section on the line 4—4 of Fig. 3;

Fig. 5 is an elevation of the length of the wire shown in Fig. 3 after a succeeding step of the method;

Fig. 6 is a section on the line 6—6 of Fig. 5;

Fig. 7 is a view similar to Fig. 5 but showing the length of wire after a still later step has been performed on it;

Fig. 8 is a section on the line 8—8 of Fig. 7;

Fig. 9 is a bottom plan view of a completed link;

Fig. 10 is an elevation of a length of chain shown diagrammatically as applied to a tire which it supports upon the ground.

I am aware that various attempts have been made to provide the links in tire chains with caulks or lugs which tend to prevent skidding or slipping. These lugs have always been welded onto the links in practice, which is an expensive operation and which furthermore is unsatisfactory in that, when the chains are used in traffic, the caulks or lugs are loosened and come off the links.

According to my invention, I provide a link in the form of a single piece of wire with portions of its lengths reduced in cross-sectional area or, more specifically, reduced in depth, leaving projections or unreduced portions which form the caulks or lugs. This may be done by the method shown diagrammatically in the drawing.

In Figs. 1 and 2, I have shown a wire 1 of the usual cylindrical form and of sufficient diameter for the purpose. By suitable metal working tools, the wire may be drawn into the oval form shown at 2. In the following description and claims, it will be convenient to refer to the various parts with relation to the ground, and therefore I shall assume that when the wire is formed into oval shape as just stated, its depth is increased and its width is decreased.

After the wire is formed into the oval shape, it may be cut into lengths 3, one of which is shown in Fig. 3, and it will be seen that its depth 4 is greater than its width 5 (Fig. 4). The length of the piece of wire shown in Fig. 3 is such that when its two ends are brought together, it will form a link of the desired shape and size.

The next step comprises the reducing of the depth of the length 3 by removing the metal at portions 6, 7, and 8, leaving unreduced and preferably elongated portions 9 and 10 spaced apart and thus forming projections. The spacing of these projections will be more fully discussed presently, but for the moment it is sufficient to say that they are spaced apart and preferably they are also spaced from the two ends 11 and 12 of the length.

The above described operation may be performed in any suitable manner, either by cutting away the metal of the wire between the projections 9 and 10, or by other methods known in the art of metal working. Then the wire below the portions 6, 7, and 8 may be rounded, as indicated in Figs. 7 and 8, which may be done by swedging, after which the two ends 11 and 12 may be brought into contact with each other and welded together as at 13 (Fig. 9) to form a link, which is then twisted to give a shaped link as in Fig. 10.

It will be seen that the resulting link is provided with the usual loops 14 and 15 at opposite ends thereof, which are adapted to receive corresponding loops on other links, and that the two opposite sides 16 and 17 of the link are relatively straight and parallel to each other, as viewed in Fig. 9, but that each side is inclined to the ground 18 and also is inclined to the other side, the two sides appearing to cross each other, as viewed in Fig. 10. In that figure, I have indicated the ground at 18 diagrammatically, it being understood that by the word "ground" I refer to any surface adapted to be contacted by a tire or chain thereon, such as a pavement or roadway of any kind. The outline of the tire tread is shown diagrammatically at 19.

For the purpose of illustration, I have shown in Fig. 10 three links constructed according to my invention, and it will be seen that on each of the sides 16 and 17 the lower end of that side, which of course is the ground-engaging portion thereof, is provided with one of the lugs or projections 9 or 10, as the case may be. Each of these projections is provided with a surface 20 which is generally parallel to the side of the link to which it is secured, and preferably each surface terminates in an abrupt shoulder 21 so that the surface 20 and the shoulder 21 between them form a sharp edge 22 adapted to bite into the ground 18. It will also be seen that on each link there are two such edges 22, one adapted to bite into the ground as a skid starts to develop in one direction, whereas the other edge will tend to bite into the ground in a similar manner to prevent a skid in the opposite direction, each direction being lengthwise of the chain.

I have not thought it necessary to illustrate the way in which the chain is secured to the tire or to the wheel upon which the tire is mounted, as the details of such structure may vary widely and do not affect the operation of my invention. The chain with which my invention is used is usually a cross chain, as it is termed in the art, which may be applied to a tire chain or to an emergency unit, as the case may be. Likewise, the invention may be used with any chain where it is desirable to achieve a result similar to that for which a tire chain is used.

From the above it will be seen that the caulks or projections 9 or 10 are part of the same metal as the wire, so that there is no danger of their being separated because of poor welding or other connections to the body of the wire as in the prior art. Also it will be seen that the invention makes it possible to place the projections wherever desired without reference to the welded ends of the length of wire which forms the link.

I am aware that attempts have been made to provide projections which are of the same metal as the wire, but, so far as I am aware, those efforts have been limited to the formation of at least one projection directly at the point where two pieces of the link are welded together as in the patent to Hall 1,972,297. According to my invention, however, the joint 13 may be formed substantially at the center of one side of the link, where it is more practical to form it, while the lugs may be placed where desired, preferably removed from the joint. Similarly, there is no such deformation of the metal as is required in the process shown in said Hall patent, which deformation is apt to result in a projection having metal that is not of as good quality as that in the rest of the link. Other advantages will be apparent to those skilled in the art.

While I have shown a selected form of link and a selected method by which that link may be made, I am aware that various changes in both link and method will suggest themselves to those skilled in the art, and I do not intend to limit myself except by the appended claims.

I claim:

1. In a tire chain, a ground-engaging twisted link formed of a single piece of wire having its ends meeting and welded together, said link having two sides extending lengthwise of the chain and inclined to the ground and to each other, whereby one end portion of each side may engage the ground, said wire having relatively great depth and cross-sectional area at said ground-engaging end portions of said sides and the portions of the wire intermediate said ground-engaging end portions having relatively less depth and cross-sectional area than said ground-engaging end portions, said welded ends being located in one of said intermediate portions of the wire.

2. In a tire chain, a ground-engaging twisted link formed of a single piece of wire having its ends meeting and welded together, said link having two sides extending lengthwise of the chain and inclined to the ground and to each other, whereby one end portion of each side may engage the ground, said wire having relatively great depth and cross-sectional area at said ground-engaging end portions of said sides and the portions of the wire intermediate said ground-engaging end portions having relatively less depth and cross-sectional area than said ground-engaging end portions, said welded ends being located in one of said intermediate portions of the wire, said ground-engaging end portions of the wire forming projections extending lengthwise of the respective sides of the link and having lower surfaces respectively parallel to said sides.

3. In a tire chain, a ground-engaging twisted link formed of a single piece of wire having its ends meeting and welded together, said link having two sides extending lengthwise of the chain and inclined to the ground and to each other, whereby one end portion of each side may engage the ground, said wire having relatively great depth and cross-sectional area at said ground-engaging end portions of said sides and the portions of the wire intermediate said ground-engaging end portions having relatively less depth and cross-sectional area than said ground-engaging end portions, said welded ends being located in one of said intermediate portions of the wire, said ground-engaging end portions of the wire forming projections extending lengthwise of the respective sides of the link and having lower surfaces respectively parallel to said sides and terminating in abrupt shoulders at their lower ends.

GEORGE J. CAMPBELL, Jr.